United States Patent [19]

Zaleski

[11] Patent Number: 4,981,729

[45] Date of Patent: Jan. 1, 1991

[54] ELECTROCONDUCTIVE AQUEOUS COATING COMPOSITIONS, PROCESS, AND COATED SUBSTRATES

[75] Inventor: Richard R. Zaleski, Mentor, Ohio

[73] Assignee: Man-Gill Chemical Company, Cleveland, Ohio

[21] Appl. No.: 356,857

[22] Filed: May 25, 1989

[51] Int. Cl.$^5$ ............................................. B05D 3/02
[52] U.S. Cl. ................................. 427/393.5; 252/500; 427/412.1; 427/412.3; 427/412.5; 428/412; 428/480; 428/500
[58] Field of Search ...................... 252/500; 427/385.5, 427/393.5, 412.1, 412.3, 412.5; 428/412, 480, 500

[56] References Cited

U.S. PATENT DOCUMENTS

| | | | |
|---|---|---|---|
| Re. 28,543 | 9/1975 | Boothe et al. | 428/514 |
| 1,846,247 | 2/1932 | Bruson . | |
| 1,853,334 | 4/1932 | Bruson . | |
| 2,923,701 | 2/1960 | Schuller et al. | 260/85.5 |
| 3,288,770 | 11/1966 | Butler | 260/88.3 |
| 3,461,163 | 8/1969 | Boothe | 260/567.6 |
| 3,674,711 | 7/1972 | Growald et al. | 252/500 |
| 3,855,085 | 12/1974 | Rushmere | 204/55 R |
| 4,084,034 | 4/1978 | Jansma et al. | 428/342 |
| 4,222,901 | 9/1980 | Sinkovitz | 252/500 |
| 4,424,240 | 1/1984 | Kielbania | 427/412.3 X |

OTHER PUBLICATIONS

Witcobond W-240, Apr. 1986, Organics Division, Witco Corporation, 3 pages.
Witcobond W-232, Witcobond W-234, Apr. 1986, Organics Division, Witco Corp., 5 pages.
Eastman Chlorinated Polyolefins in Coatings for Selected Plastics, Eastman Kodak Company, 5 pages.
Cymel 370, 373 and 380, Cross-Linking Agents, American Cyanamid Company, Wayne, N.J., 3 pages.
Synotex 800 Cyclized Rubber for Coatings, Daniel Products Co., Jersey City, N.J., 1 page.
Monazolines, Technical Bulletin 380E, Apr. 1985, Mona Industries, Inc., 11 pages.

*Primary Examiner*—Michael Lusignan
*Attorney, Agent, or Firm*—Renner, Otto, Boisselle & Sklar

[57] ABSTRACT

In accordance with the present invention, there is provided an aqueous electroconductive composition which is particularly useful as a coating composition for non-porous substrates. The aqueous compositions comprise
(A) at least one water-dispersible or emulsifiable film-forming resin;
(B) at least one electrically conductive polymer of a quaternary ammonium compound containing at least one polymerizable unsaturated group;
(C) at least one hydrocarbon-soluble substituted imidazoline of a fatty acid;
(D) at least one volatile organic liquid; and
(E) water.

In one embodiment, the aqueous electroconductive compositions are in the form of oil-in-water emulsions. The invention also relates to the use of such electroconductive coating compositions as adherent primer coatings for substrates, and in particular, non-porous substrates. Electroconductive coating compositions for depositing coatings on non-porous substrates which do not contain the substituted imidazoline (C) also are described.

61 Claims, No Drawings

ELECTROCONDUCTIVE AQUEOUS COATING COMPOSITIONS, PROCESS, AND COATED SUBSTRATES

TECHNICAL FIELD

This invention relates to electroconductive aqueous compositions, and more particularly to such aqueous compositions which are useful as coating compositions. The compositions are particularly suitable as primer coatings on non-porous substrates such as plastics.

BACKGROUND OF THE INVENTION

Polymers and other plastics have been developed which are useful in many applications including automotive parts, engineering plastics, toys, containers, molded items and packaging films. It is often desirable to decorate or to protect items made from these plastics by applying a coating or an aesthetically pleasing design to the plastic. It is obviously important that the coating is tightly bonded to the plastic surface. Plastic surfaces as well as certain non-plastic surfaces such as metal including aluminum and galvanized steel are not particularly receptive to the application of adherent coatings because the surfaces are essentially non-porous. Accordingly, there is a continuing need for coating compositions which exhibit excellent adhesion to plastics and metals, and in particular, to plastics.

Improved adhesion of decorative and protective coating compositions to various substrates, and in particular, non-porous substrates, has been achieved by the application of base coats or primer coats to the substrate prior to the application of the desired decorative coating. Since primer coatings are not visible, they do not have to possess all of the desirable characteristics of the top coatings such as color retention, mar-resistance, chalk-resistance, dirt-resistance, etc. Thus, primer coatings can be formulated with major emphasis on adhesion to substrates, and adhesion to subsequent basecoats and/or topcoats.

In many applications, it is desirable that the primer coating be electroconductive to allow the application of base coats or top coats over these primers by electrostatic coating techniques. Conductive materials, particularly conductive powders such as carbon blacks and various inorganic additives have been included in the coating compositions to impart the desired conductive characteristics to the coating. Satisfactory conductivity levels are obtained but the inorganic conductive additives are often rejected because of excessive weight and/or objectionable color. Poor tolerance of humidity variations is often a characteristic of such additives.

Dialkyl diallyl ammonium salts such as the chloride salts, and homopolymer and copolymers of said salts have been suggested as useful components in coatings for preparing electroconductive paper. U.S. Pat. No. 4,222,901 describes electroconductive resin coating compositions containing a copolymer of a quaternary ammonium conductive monomer and at least 15% by weight of acrylamide. Various conductive polymers are described including polymers derived from dialkyl diallyl ammonium chloride. Other patents describing the use of dialkyl diallyl ammonium salts, polymers and copolymers thereof, and mixtures with other materials in conductive coatings for paper include, for example, U.S. Pat. No. 4,084,034 which describes and claims electroconductive paper having a layer containing sodium chloride in a water-soluble polymer consisting of units derived from dimethyl diallyl ammonium chloride. The electroconductive paper can be used to distribute electrical stresses in various insulating products and in various types of non-impact printing processes such as electrostatographic, electrophotographic, electrographic, etc. U.S. Pat. No. Re. 28,543 discloses a variety of electroconductive materials including polymers of diallyl ammonium chloride for use in non-impact printing. Copolymers also are disclosed.

The literature also includes suggestions of the use of resin compositions containing dialkyl diallyl ammonium polymers and copolymers as textile-treating agents, as core binders, and adhesive and laminating compositions, as thickening agents, etc.

The preparation of and the description of various dialkyl diallyl ammonium salts, polymers and copolymers also is contained in various patents and publications including U.S. Pat. Nos. 2,923,701; 3,461,163; 3,674,711; 4,222,901; and Re 28,543.

U.S. Pat. No. 3,674,711 also describes clear transparent conductive films by combining a quaternary ammonium polyelectrolyte, such as polydimethyl diallyl ammonium chloride, with a film-forming polymer such as polyvinyl alcohol and a neutral solvent such as water. The mixture can be cast on a smooth surface (e.g., glass), the mutual solvent evaporated, and the resultant sheet material stripped from the casting surface to obtain a sheet of electrically conductive clear transparent plastic material useful as a conductive plastic or, after coating with a charge retentive film, as an electrographic recording medium.

For many years, curable coating compositions useful as paints, varnishes, etc., have been dissolved in volatile hydrocarbon solvents to facilitate the deposition of thin films on the substrates to be coated and to enable the solvent to evaporate into the atmosphere within a reasonable period of time leaving a dry nontacky coating. The use of such volatile hydrocarbon solvents as diluents, therefore, results in air pollution problems.

More recently, the coatings industry has directed its attention to the problem of volatile organic emissions from organic coating compositions. These efforts have been encouraged by various governmental and state agencies concerned with the air pollution caused by the use of volatile hydrocarbon solvents. Such efforts by the coatings industry has resulted in the development of a number of high-solids resin or water-borne coating formulations which contain significantly reduced amounts of solvents, and, in some instances, little or no solvent.

Some difficulty has been observed in coating certain substrates with these high solids, low solvent coating compositions necessitating the use of primer coatings which generally contain very high levels of solvents.

SUMMARY OF THE INVENTION

In accordance with the present invention, there is provided an aqueous electroconductive composition which is particularly useful as a coating composition for non-porous substrates such as plastics. The aqueous compositions comprise (A) at least one water-dispersible or emulsifiable film-forming resin;

(B) at least one electrically conductive polymer of a quaternary ammonium compound containing at least one polymerizable unsaturated group. The compositions preferably also contain (C) at least one hydrocarbon-soluble substituted imidazoline of a fatty acid;
(D) at least one volatile organic liquid; and
(E) water.

In one embodiment, the aqueous electroconductive compositions are in the form of oil-in-water emulsions. The invention also relates to the use of such electroconductive coating compositions as adherent primer coatings for substrates, and in particular, non-porous substrates. Electroconductive coating compositions for depositing coatings on non-porous substrates which do not contain the substituted imidazoline (C) also are described.

DESCRIPTION OF THE PREFERRED EMBODIMENTS

The aqueous compositions of the present invention are characterized as being low VOC (volatile organic content), and in particular, by a VOC of less than about 3.5 pounds/gallon. VOC is defined as the ratio of solvent to non-volatile solids. The water present in the aqueous composition does not enter into the calculation.

(A) Water-Dispersible or Emulsifiable Film-Forming Resin

The aqueous composition of the present invention contain (A) at least one water-dispersible or emulsifiable film-forming resin. Any water-dispersible or emulsifiable film-forming resin can be utilized in the aqueous compositions of the present invention provided that the aqueous compositions containing such resins deposit an adherent electroconductive coating on non-porous substrates. The resins which have been found to be particularly useful in the aqueous compositions of the present invention are thermosetting resins such as urethanes, amino resins, acrylic resins, alkyd resins, epoxy resins, phenolic resins, cyclized olefin rubbers, halogenated polyolefins, halo-sulfonated polyolefins, and mixtures thereof. Particularly useful are the urethane resins, the amino resins, and mixtures of amino resins, (e.g., melamine resins) and at least one thermosetting resin capable of cross-linking the amino resin thereof.

The polyurethane resins useful in the invention are those formed by reacting an organic diisocyanate with an active hydrogen-containing material such as polyalkylene ether glycols and hydroxy-terminated polyesters to form isocyanate-terminated polyurethane prepolymers which can be cross-linked or cured with known agents such as compounds having at least two amino nitrogen atoms each having at least one reactive hydrogen atom. Alternatively, the active hydrogen compound, organic diisocyanate and chain extender can be reacted in one shot to form the desired polymer.

In the preparation of polyester-urethane resins, there preferably are used hydroxy-terminated polyesters prepared by polycondensation of an aliphatic dicarboxylic acid and a molar excess of an aliphatic glycol, and those prepared by ring-opening polymerization of a cyclic ester of the presence of a difunctional compound as an initiator. The polyesters obtainable by polycondensation of an aliphatic dicarboxylic acid and an aliphatic glycol are exemplified by those obtained by reaction between adipic acid, sebacic acid, maleic acid and other dicarboxylic acids with ethylene-glycol, 1,2-propylene glycol, 1,4-butylene glycol, 1,3-butylene glycol, etc. Examples of the polyesters prepared by polymerization of cyclic esters are those prepared by epsilon-caprolactone, delta-methyl-epsilon-caprolactone and beta-propiolactone in the presence of an initiator such as, for example, 1,4-butylene glycol, ethylene glycol or diethylene glycol.

The polyalkylene ether urethanes are those prepared by reacting the isocyanates with polymeric polyhydroxy compounds which include polyether polyols such as polyalkylene ether glycols, polyalkylene arylene ether-thioether glycols and polyalkylene ether triols. The polyalkylene ether glycols and triols are preferred and these include glycols having the formula $HO(RO)_nH$ wherein R is an alkylene radical which need not necessarily be the same in each instance, and n is an integer. Representative glycols include polyethylene ether glycol, polypropylene ether glycol and polytetramethylene ether glycol. Representative polyalkylene ether triols are made by reacting one or more alkylene oxides with one or more low molecular weight aliphatic triols. The alkylene oxides most commonly used have molecular weights between about 44 and 250 and these include ethylene oxide, propylene oxides, butylene oxides, 1,2-epoxybutane and 2,3-epoxybutane. The ethylene, propylene and butylene oxides are preferred. The aliphatic triols most commonly used have molecular weights between about 92 and 250. Examples include glycerol, 1,2,6-hexane triol and 1,1,1-trimethylol propane.

Representatiave examples of the polyalkylene ether triols include: polypropylene ether triol (molecular weight 700) made by reacting 608 parts of 1,2-propylene oxide with 92 parts of glycerin; and polypropylene ether triol (molecular weight 6000) made by reacting 5,866 parts of 1,2-propylene oxide with 132 parts of 1,2,6-hexane triol.

Other active hydrogen-containing compounds which can be reacted with polyisocyanates to form urethanes useful in the coating compositions of the invention are long-chain polymers containing at least two groups having at least one active hydrogen atom as determined by the Zerewitinoff method. Examples of such compounds include in addition to the polyesters and polymeric polyhydroxy compounds described above, polyamides, polyepoxides, reaction products of phenols and alkylene oxides, formaldehyde resins, hydrogenation products of olefin-carbon monoxide copolymers and polyepihalohydrins.

The amino resins (sometimes referred to as polyalkylene amides) useful in the coating compositions are nitrogen-rich polymers containing nitrogen in the amino form, $-NH_2$. The starting amino-bearing material is usually reacted with an aldehyde (e.g. formaldehyde) to form a reactive monomer, which is then polymerized to a thermosetting resin. Examples of amino-bearing materials include urea, melamine, copolymers of both with formaldehyde, thiourea, aniline, dicyanodiamide, toluene sulfonamide, benzoguanamine, ethylene urea and acrylamide. Preferred amino resins are the melamine-formaldehyde and urea-formaldehyde resins.

Condensation products of other amines and amides can also be employed, for example, aldephyde condensates of triazines, diazines, triazoles, guanadines, guanamines and alkyl- and aryl-substituted derivatives of such compounds including alkyl- and aryl-substituted ureas and alkyl- and aryl-substituted melamines. Some examples of such compounds are N,N'-dimethylurea, benzourea, dicyandiamide, 2-chloro-4,6-diamino-1,3,5-triazine and 3,5-diaminotriazole. Other examples of melamine and urea-based cross-linking resins include alkylated melamine resins including methylated melamine-formaldehyde resins such as hexamethoxymethyl melamine, alkoxymethyl melamines and ureas in which the alkoxy groups have 1-4 carbon atoms such as methoxy, ethoxy, propoxy, or butoxymethyl melamines and dialkoxymethyl ureas; alkylol melamines and ureas such as hexamethylol melamine and dimethylol urea. The aminoplast cross-linking resins are particularly useful when the thermosetting resin in the next coating is an alkyd resin, a polyester resin, an epoxy resin or an acrylic resin.

Some particularly useful commercially available aminoplast resins are amino resins sold by American Cyanamid under the general trade designation CYMEL. In particular, CYMEL 301, CYMEL 303 and CYMEL 1156, all of which are alkylated melamine-formaldehyde resins, are useful herein. Additional melamine-formaldehyde resins available from American Cyanamid include CYMEL 350, 370, 373, 380, 1116, 1130 and 1158. Benzoguanamines are available from American Cyanamid as CYMEL 1123, 1125 and 1134. Partially alkylated melamine resins from American Cyanamid include CYMEL 235, 243, 245, 248, 255, 270 and 280.

The acrylic resins are obtained by polymerizing a suitable combination of a functional group-containing monomer and another copolymerizable monomer in an ordinary manner. The polymerization temperature is ordinarily between about 60° C. and about 100° C., and polymerization time is usually within a range of about 3 to about 10 hours. Examples of the functional gruop-containing monomers include hydroxyl group-containing monomers such as beta-hydroxyethyl acrylate, beta-hydroxypropyl acrylate, beta-hydroxyethyl methacrylate, beta-hydroxypropyl methacrylate, N-methylol acrylamide and N-methylol methacrylamide; carboxyl group-containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene, propylene and isobutylene; aromatic monomers such as styrene, vinyltoluene and alphamethylstyrene; ester of methacrylic acid and alcohols of 1 to about 18 carbon atoms such as methylmethacrylate, ethylmethacrylate, propylmethacrylate, n-butylmethacrylate, isobutylmethacrylate, cyclohexylmethacrylate, 2-ethylhexylmethacrylate and laurylmethacrylate; vinyl esters of carboxylic acid of about 2 to about 11 carbon atoms such as vinyl acetate, vinyl propionate and vinyl 2-etyhylhexylic acid; as well as vinyl chloride, acrylonitrile and methacrylonitrile. They may be used either alone or in the form of a mixture of two or more of them.

The alkyd resins are obtained by reacting a dihydric or polyhydric alcohol and a polybasic acid or anhydride in the presence of a drying oil using known techniques. Examples of the dihydric or polyhydric alcohols include glycerol, pentaerythritol, sorbitol and diethylene glycol. Examples of the polybasic acids or anhydrides include phthalic acid, isophthalic acid, maleic anhydride, fumaric anhydride, nonconjugated linoleic acid, oleic acid, adipic acid, azelaic acid, sebacic acid, tetrachlorophthalic anhydride, and chlorendic anhydride. Examples of the drying oils include soybean oil, linseed oil, dehydrated castor oil, non-oxidizing castor and coconut oils, tung oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to about 235° C. Solvents are then added to adjust the solids content. The amount of drying oil varies depending on the intended use. With respect to the high solids compositions of the invention, the level of drying oil is preferably minimized.

Thermosetting epoxy resins are useful in the present invention as component (A) and they include any one of a number of well-known organic resins which are characterized by the presence therein of the epoxide group

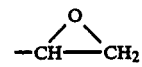

A wide variety of such resins are available commercially. Such resins have either a mixed aliphatic-aromatic or an exclusively non-benzeneoid (i.e., aliphatic or cycloaliphatic) molecular structure.

The mixed aliphatic-aromatic epoxy resins which are useful with the present invention are prepared by the well-known reaction of a bis(hydroxy-aromatic)alkane or a tetrakis-(hydroxyaromatic)-alkane with a halogen-substituted aliphatic epoxide in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules which vary in size according to the relative proportions of reactants and the reaction time.

In lieu of the epichlorohydrin, one can use halogen-substituted aliphatic epoxides containing about 4 or more carbon atoms, generally about 4 to about 20 carbon atoms. In general, it is preferred to use a chlorine-substituted terminal alkylene oxide (terminal denoting that the epoxide group is on the end of the alkyl chain) and a particular preference is expressed for epichlorohydrin by reason of its commercial availability and excellence in forming epoxy resins useful for the purpose of this invention.

If desired, the halogen-substituted aliphatic epoxide may also contain substituents such as, e.g., hydroxy keto, nitro, nitroso, ether, sulfide, carboalkoxy, etc.

Similarly, in lieu of the 2,2-bis-(p-hydroxyphenyl)-propane, one can use bis-(hydroxyaromatic) alkanes containing about 16 or more carbon atoms, generally about 16 to about 30 carbon atoms such as, e.g., 2,2-bis-(1-hydroxy-4-naphthyl)-propane; 2,2-bis(o-hydroxyphenyl)propane; 2,2-bis-(p-hydroxyphenyl) butane, 3,3-bis-p-hydroxyphenyl)hexane; 2-(p-hydroxyphenyl)-4-(1-hydroxy-4-naphthyl)octane, 5-5-bis-(p-hydroxy-o-methylphenyl)-decane, bis-(p-hydroxyphenyl) methane, 2,2-bis-(p-hydroxy-o-isopropylphenyl)propane, 2,2-bis-(o,p-dihydroxyphenyl)propane, 2-(p-hydroxyphenyl)-5-(o-hydroxyphenyl)hexadecane, and the like. If desired, the bis-(hydroxyaromatic)alkane may contain substituents such as, e.g., halogen, nitro, nitroso, ether, sulfide, carboalkoxy, etc. In general, it is preferred to use a bis-(p-hydroxyphenyl)alkane since compounds of this type are readily available from the well-known condensation of phenols with aliphatic ketones or aldehydes in the presence of a dehydrating agent such as sulfuric acid. Particularly preferred is 2,2-bis-(p-hydroxyphenyl)propane, which is available commercially as "Bisphenol A".

The phenolic resins are any of the several types of synthetic thermosetting resins made by reacting a phenol, cresols, xylenols, p-t-butyl phenol p-phenyl phenol, bis-phenols and resorcinol. Examples of the aldehydes include formaldehyde, acetaldehyde and furfural. Phenol-formaldehyde resins are a preferred class of such phenolic resins.

Cyclized olefin rubbers found to be useful in the coating compositions of the present invention include the cyclized rubbers obtained by isomerization of linear polyolefins such as polyisoprene into ring structures. More particularly, the cyclized rubber can be made by condensing rubber with metallic or metalloid halide catalysts such as stannic chloride, titanium tetrachloride, ferric chloride and antimony pentachloride in a suitable solvent. Upon treatment of the resultant product with acetone or alcohol, the cyclized rubber is formed and recovered. Other procedures for preparing cyclized rubber are described in U.S. Pat. Nos. 1,846,247; 1,853,334. The solvent may be an aromatic solvent such as toluene, xylene, benzene, and high-flash aromatic naphthas.

A commercially available cyclized olefin rubber found to be useful in the coating compositions of the present invention, either alone or in combination with other olefin polymers such as chlorinated polyolefins is a cyclized rubber derived from synthetic rubber by isomerization of the linear polyisoprene. This material is available from Daniel Products Company, Jersey City, N.J., under the general trade designation Synotex 800.

The water-dispersible or emulsifiable filmforming resin utilized in the aqueous compositions of the present invention also may be chlorinated polyolefins such as chlorinated polyethylene, chlorinated polypropylene, mixtures of chlorinated polyethylene and chlorinated polyolefin, etc. Chlorosulfonated polyolefins such as chlorosulfonated polyethylene and chlorosulfonated polypropylene also may be utilized.

Examples of chlorinated polyolefins which are useful in the aqueous compositions of the present invention include the chlorinated polyolefins available from Eastman Chemical Products, Inc. under the designations CP-343-1 and CP-343-3 which are chlorinated polyolefins in various concentrations of xylene including solutions containing 40% and 50% of the chlorinated polyolefins in xylene. Commercially available chlorosulfonated polyethylenes are available from the DuPont Company under the general trade designation Hypalon Synthetic Rubber.

Chlorosulfonated olefins such as chlorosulfonated polyethylene are derived from the reaction of a mixture of chlorine and sulfur dioxide on any of the various polyethylenes. The product of this reaction is a chemically modified form of the original polyethylene, and the product may contain from 20% to about 40% chlorine and about 1% to 2% sulfur present mostly as secondary sulfonyl chloride groups (RR'CHSO$_2$Cl). The sulfonyl chloride groups are available as cross-linking or curing sites.

(B) Electrically Conductive Polymer of a Quaternary Ammonium Compound

The electrically conductive aqueous coating compositions of the present invention also contain at least one electrically conductive polymer of a quaternary ammonium compound containing at least one polymerizable unsaturated group. In one embodiment, the quaternary ammonium compound containing at least one polymerizable unsaturated group is characterized by the formula

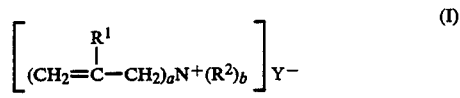

wherein each 1 is independently hydrogen or a lower alkyl group, each $R^2$ is independently alkyl, hydroxy alkyl or alkoxy alkyl groups containing from 1 to about 18 carbon atoms, a is an integer of from 1 to 3, b is an integer of from 1 to 3 provided that the sum of $a+b=4$, and $Y^-$ is an anion.

The lower alkyl group $R^1$ may be methyl, ethyl, and the various isomers of propyl, butyl, pentyl, hexyl, and heptyl. Generally, the $R^1$ group will be hydrogen. The $R^2$ groups generally will be alkyl, hydroxy alkyl or alkoxy alkyl groups containing from 1 to about 18 carbon atoms. In another preferred embodiment, a and b are each 2 and each $R_2$ is a lower alkyl, lower hydroxy alkyl, a lower alkoxy alkyl group containing 1 to about 7 carbon atoms. Specific examples of $R^2$ groups include methyl, ethyl, propyl, butyl, hexyl, octyl, dodecyl; hydroxy alkyl groups such as hydroxy methyl, and the various hydroxy ethyl to hydroxy octadecyl isomers; and alkoxy alkyl such as methoxy methyl and the various higher alkoxy alkyl groups such as methoxy ethyl, methoxy butyl, butoxy methyl, ethoxy methyl, etc.

Representative examples of $Y^-$ in Formula I are the halide ions such as chlorine, bromine, fluorine or iodine, sulfate, sulfonate, phosphate, hydroxide, borate, cyanide, carbonate, thiocyanate, thiosulfate, isocyanate, sulfite, bisulfite, nitrate, nitrite, oxalate, and the other common inorganic and organic ions.

Examples of compounds represented by Formula I include trimethylallyl ammonium chloride, trimethyl methallyl ammonium chloride, dimethyl diallyl ammonium chloride (referred to in the art and herein as DMDAAC), dimethyl dimethallyl ammonium chloride, dimethyl allyl methallyl ammonium chloride, diethyl diallyl ammonium chloride (DEDAAC), methyl triallyl ammonium chloride, and other similar compounds such as, for example, where the methyl groups are replaced by other alkyl hydroxy alkyl or alkoxy alkyl groups as exemplified more fully below.

In a more preferred embodiment, the quaternary salt is represented by the formula

wherein each $R^1$ is independently hydrogen or a lower alkyl group, $R^3$ and $R^4$ are each independently alkyl, hydroxy alkyl or alkoxy alkyl groups containing from 1 to about 18 carbon atoms, and $Y^-$ is an anion. Preferably, $R^1$ is hydrogen. The groups $R^3$ and $R^4$ may each independently contain from 1 to 18 carbon atoms, and in one preferred embodiment, these groups will contain from 1 to about 7 carbon atoms. Examples of $R^3$ and $R^4$ groups include methyl, ethyl, propyl, butyl, hexyl, octyl, dodecyl; hydroxy alkyl groups such as hydroxy methyl, and the various hydroxy ethyl to hydroxy octadecyl isomers; and alkoxy alkyl such as methoxy methyl and the various higher alkoxy alkyl groups such as methoxy ethyl, methoxy butyl, butoxy methyl, ethoxy methyl, etc.

Representative examples of the lower alkyl $R^1$ groups include methyl, ethyl, propyl, etc. Illustrative examples of the anion ($Y^-$) in Formula IA are the halide ions such as chlorine, bromine, fluorine or iodine, sulfate, sulfonate, phosphate, hydroxide, borate, cyanide, carbonate, thiocyanate, thiosulfate, isocyanate, sulfite, bisulfite, nitrate, nitrite, oxalate, and the other common inorganic and organic ions.

Specific examples of the quaternary ammonium compounds represented by Formula IA include: dimethyl diallyl ammonium chloride (DMDAAC), diethyl diallyl ammonium chloride (DEDAAC), di-(beta-hydroxy ethyl) ammonium chloride, di-(beta-ethoxy ethyl) ammonium chloride, dimethyl dimethallyl ammonium chloride, dimethyl diethallyl ammonium chloride.

The quaternary ammonium compounds of the type utilized in the polymers of component (B) are known in the art, and procedures for preparing such compounds are also known. The various procedures are described in, for example, U.S. Pat. Nos. 2,923,701 and 3,461,163. Briefly, the compounds can be prepared by the reaction of an alkyl amine with unsaturated halide such as allyl chloride in the presence of a base such as sodium hydroxide. Thus, for example, dimethyl diallyl ammonium chloride can be prepared from one mole of dimethyl amine, two moles of allyl chloride and one mole of a base such as sodium hydroxide. U.S. Pat. Nos. 2,923,701 and 3,461,163 are hereby incorporated by reference for their disclosure of procedures for preparing the quaternary ammonium compounds used in the present invention and the various quaternary ammonium compounds described therein.

The electrically conductive polymer (B) in one embodiment is a copolymer of the quaternary ammonium compounds described above and at least one ethylenically unsaturated copolymerizable compound which is different from the polymerizable unsaturated group present in the quaternary ammonium compound. The copolymerizable compound preferably is represented by the general formula $$CH_2=C(R)(R')$$

wherein R is a member from the class consisting of hydrogen, halogen, and alkyl, cycloalkyl aryl, alkaryl and aralkyl groups, and R' represents a group represented by the formulae

—CN

—O—C(O)R$^2$

—C(O)OR$^3$

—C(O)R$^4$

—C(O)NR$^5$R$^6$

—OR$^2$ wherein R$^2$ and R$^3$ each represent a group selected from the class consisting of alkyl, cycloalkyl and alkoxy alkyl groups, R$^4$ is selected from the group consisting of alkyl, cycloalkyl, alkoxy alkyl and aryl groups, R$^5$ and R$^6$ each represent a member of the group consisting of hydrogen, alkyl, cycloalkyl, aryl, alkaryl, aralkyl and alkoxy alkyl groups.

Specific examples of the copolymerizable compounds include styrene, nuclearly-substituted monomethyl and dimethyl styrenes, methyl and other lower alkyl acrylates, lower hydroxy alkyl acrylates, acrylamides, acrylonitrile, methacrylonitrile, vinyl acetate, etc. Derivatives of acrylic acid, acrylamide and acrylic esters are preferred, and hydroxy alkyl esters of acrylic acid or of substituted acrylic acids are particularly preferred.

The molar percentages of the quaternary ammonium compound and the comonomer which is copolymerizable therewith may be varied considerably. Generally, the mixtures will contain from about 0.1% to about 40% or 60% of the comonomer and from about 40% or 60% to about 99.9% of the quaternary compound. The copolymerization reaction may be carried out in a suitable manner, and is preferably effected while the mixture of copolymerizable ingredients is dissolved or dispersed in an aqueous medium and with the aid of a polymerization catalyst. The linear polymer thus obtained can be isolated from the aqueous mass, or if the copolymer is formed in solution, the solution of the copolymer may be used directly without isolation of the copolymer from the aqueous mass.

Examples of the copolymers of the quaternary ammonium compound and of the ethylenically unsaturated comonomer, and the method of preparation are described in U.S. Pat. Nos. 2,923,701, 4,222,901 and Re 28,543, which are hereby incorporated by reference for their disclosure of such methods and compounds. Specific copolymers of quaternary ammonium compounds with acrylamide are exemplified.

The amount of electrically conductive polymer (B) included in the conductive aqueous coating compositions of the present invention is any amount which is effective in providing the coatings which are deposited from the aqueous coating compositions of the present invention with the desired degree of electroconductivity. Apparently, the molecular weights of the polymers and copolymers are not critical to conductivity. In one embodiment, from about 2% up to about 50% by weight or more of the conductive polymer (B) is included in the aqueous coating compositions, based on the total weight of the aqueous coating composition.

(C) Hydrocarbon-Soluble Substituted Imidazoline of a Fatty Acid

The electrically conductive aqueous coating compositions of the present invention generally contain at least one hydrocarbon-soluble substituted imidazoline of a fatty acid. These compounds can be prepared by the reaction of a fatty acid with an ethylene diamine which may contain various substituents on the carbon atoms and/or the nitrogen groups provided that at least one of the nitrogen atoms is a primary nitrogen (i.e., —NH$_2$) and a second nitrogen atom is a primary or secondary amino group (i.e., —NH$_2$ or >NH).

In one embodiment, the imidazolines (C) may be represented by the formula

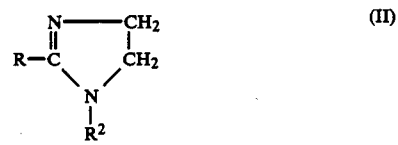
(II)

wherein R is an aliphatic group containing from about 1 to about 28 carbon atoms and more generally from about 7 to about 28 carbon atoms, and $R^2$ is an alkyl group, hydroxy alkyl group, amino alkyl group, etc. Examples of the R groups include methyl, ethyl, propyl, butyl, hexyl, octyl, decyl, dodecyl, tetradecyl, oleo, stearyl, linoleic acid, isostearic acid. Examples of the aliphatic group include.

The substituted imidazolines useful as component (C) in the compositions and process of the present invention, as mentioned above, are those obtained by the reaction of a fatty acid with an appropriate alkylene diamine containing at least one primary amino group and a second nitrogen group which is either a primary or a secondary amino group. Examples of fatty acids include commercial mixtures of fatty acids such as those contained in coconut oil, tall oil, palm oil, etc. In one embodiment, ethylene diamines are reacted with the fatty acid contain one secondary amino group to which is also attached a hydroxy alkyl group. The imidazoline obtained is represented by the formula

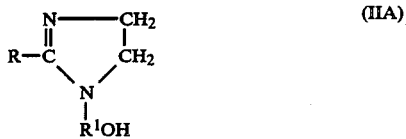

wherein R is as defined in Formula II, and $R^1$ is an alkylene group of 1 to 7 carbon atoms.

Substituted imidazolines of these types are available commercially from Mona Industries, Inc. under the general trade designation "Monazolines". The Monazoline compounds are 1-hydroxyethyl-2-alkyl imidazolines generally represented by the formula

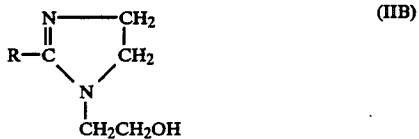

wherein R is an alkyl group containing from 7 to about 17 carbon atoms and is derived from a fatty acid or fatty acid mixture such as caprylic acid, (Monazoline CY), coconut oil (Monazoline C), oleic acid (Monazoline O) and tall oil (Monazoline T). The Monazoline products are described as organic monobasic cyclic tertiary amines which exhibit moderately strong alkaline properties.

The amount of the substituted imidazoline (C) included in the conductive aqueous coating compositions of the present invention generally will be in the range of from about 0.25% to about 5% by weight based on the total weight of the aqueous coating composition. Conductive coating compositions can be obtained in the absence of the substituted imidazolines, but it appears that the presence of the substituted imidazolines in the coating composition results in a coating having improved electroconductive properties, and in particular, improved surface conductivity.

(D) Volatile Organic Liquids

In addition to water, the aqueous compositions of the present invention also contain at least one volatile organic liquid. In one preferred embodiment, the aqueous compositions contain a mixture of at least one aliphatic hydrocarbon and at least one aromatic hydrocarbon.

Suitable solvents include mineral spirits, hexane, cyclohexane, methyl ethyl ketone, methyl isobutyl ketone, alcohols such as ethyl alcohol, propyl alcohol and diacetone alcohol, dimethylphthalate, polyols such as ethylene glycol and propylene glycol, mono- and dialkyl ethers of alcohols and glycols such as butylcarbitol(2-(2-butoxy-ethoxy)ethanol, ethylene glycol monoethylether, ethylene glycol monobutylether, ethylene glycol monoethylether acetate, diethyleneglycol monobutylether and diethylene glycol diethylether. Examples of aromatic solvents include xylene, toluene, aromatic petroleum distillates, aromatic naphthas, etc.

(F) Nonionic, Anionic and Amphoteric Surfactants

The aqueous electroconductive compositions of the present invention also may contain at least one surfactant which may be a nonionic surfactant, an anionic surfactant, an amphoteric surfactant, or mixtures thereof. The coating compositions of the invention may contain from about 0% to about 7.5% by weight of the surfactants. When present, the surfactants content generally will be in the range of 0.1% to about 7.5% by weight. These surfactants are known in the art, and many of these are described in McCutcheon's "Detergents and Emulsifiers", 1979, North American Edition, Published by McCutcheon's Division, MC Publishing Corp., Glen Rock, N.J., pp. 15–20 which lists a number of anionic, nonionic and amphoteric surfactants is hereby incorporated by reference for the disclosure in this regard. The surfactants may be added to the aqueous compositions directly, or the surfactant may be present in some of the other components used to form the aqueous compositions of the invention. For example, some commercial resin dispersions contain surfactants for stability. In these instances, the amount of surfactant added to the aqueous compositions can be reduced in proportion to the amount of surfactant supplied by resin dispersions used to form the aqueous compositions.

(F-1) Nonionic Surfactants

In general, nonionic surfactants such as those containing ether linkages are particularly useful in the aqueous compositions of the invention. Examples of such ether-containing surfactants are those having the general formula

wherein $R_1$ is an aryl or alkyl group containing from about 6 to about 20 carbon atoms, n is 2 or 3, and x is an integer between 2 and 100. Such surfactants are produced generally by treating fatty alcohols or alkylsubstituted phenols with excess ethylene oxide or propylene oxide. The alkyl carbon chain may contain from about 14 to about 24 carbon atoms and may be derived from a long chain fatty alcohol such as oleyl alcohol or stearyl alcohol.

Nonionic polyoxyethylene compounds of this type are described in U.S. Pat. No. 3,855,085. Such polyoxyethylene compounds are available commercially under the general trade designations "Surfynol" by Air Products and Chemicals, Inc. of Allentown, Pa., and under the designation "Pluronic" or "Tetronic" by BASF Wyandotte Corp. of Wyandotte, Mich. Examples of specific polyoxyethylene condensation products include "Surfynol 465" which is a product obtained by reacting about 10 moles of ethylene oxide with 1 mole of tetramethyldecynediol. "Surfynol 485" is the product obtained by reacting 30 moles of ethylene oxide with tetramethyldecynediol. "Pluronic L 35" is a product obtained by reacting 22 moles of ethylene oxide with polypropylene glycol obtained by the condensation of 16 moles of propylene oxide. Also useful is Atlox 1045A from ICI America, Inc. Which is a polyoxyalkylene sorbitol oleate-laurate mixture.

Nonionic surfactants also are available from Rohm & Haas Company under the general trade designation "Triton". For example, Triton CF10 is an alkyl aryl polyether.

Amine, long chain fatty amine, long chain fatty acid, alkanol amines, diamines, amides, alkanol amides and polyglycol-type surfactants known in the art are also useful. One type found particularly useful is the group obtained by the addition of a mixture of propylene oxide and ethylene oxide to diamines. More specifically, compounds formed by the addition of propylene oxide to ethylene diamine followed by the addition of ethylene oxide are useful and are available commercially from BASF Wyandotte Inc. Chemical Company under the general trade designation "Tetronic".

Carbowax-type wetting agents which are polyethylene glycols having different molecular weight have been found to give good results. For example, Carbowax No. 1000 has a molecular weight range of from about 950 to 1050 and contains from 20 to 24 ethoxy units per molecular. Carbowax No. 4000 has a molecular weight range of from about 3000 to 3700 and contains from 68 to 85 ethoxy units per molecule. Other known nonionic glycol derivatives such as polyalkylene glycol ethers and methoxy polyethylene glycols which are available commercially can be utilized as surfactants in the compositions of the invention.

(F-2) Anionic Surfactants

Anionic surfactants also may be present in the aqueous compositions of the invention. Among the useful anionic surfactants are the widely-known metal carboxylate soaps, organo sulfates, sulfonates, sulfocarboxylic acids and their salts, and phosphates. Various anionic surfactants are readily available commercially, and further information about anionic surfactants can be found in the text "Anionic Surfactants" Parts II and III, edited by W. M. Linfield, published by Marcel Dekker, Inc., New York, 1976. Examples of anionic surfactants available from ICI America, Inc. include Atlas G-2205 which is an aromatic phosphate and Atlas G-3300 which is an alkyl aryl sulfonate. Examples of anionic surfactants available from Rohm & Haas Company include Triton 770 which is a dioctyl sodium sulfosuccinate, Triton H-55 which is a phosphate surfactant, potassium salt, Triton W-30 and Triton X200 which are sodium salts of alkyl aryl polyether sulfonates, etc. An example of an anionic snionic surfactant available from Witco Corporation is Witconate P1059 which is a hydrocarbon soluble isopropylamine salt of dodecyl benzene sulfonic acid.

(F-3) Amphoteric Surfactants

The surfactants used in the coating formulations of the invention may be amphoteric surfactants which are well known in the art. Lecithin is an example of a useful amphoteric surfactant and water-dispersible grades of lecithin are preferred.

Amphoteric ethylene oxide condensates also are useful.

Examples of amphoteric condensates are sulfonated ethoxylated aliphatic amines such as sulfonated ethoxylated fatty amines and condensates represented by the formula

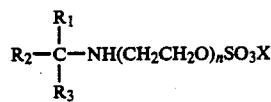

wherein $R_1$, $R_2$ and $R_3$ are each independently straight or branched chain alkyl groups, preferably containing about 8 to 18 carbon atoms, n is an integer of from about 5 to about 20, and X is a compatible cation such as sodium, potassium, ammonium, magnesium, tin, lead calcium, etc. Such amphoteric condensates are known in the art. Examples of commercially available amphoteric condensates useful in the coating formulations of the invention include the sulfated fatty polyoxyethylene quaternary nitrogen compound available from GAF Corporation under the trade designation "Antaron PC-37", and a condensate of the type represented by the formula available from Rohm and Haas Co. under the trade designation "Triton QS-15" wherein $R_1$, $R_2$ and $R_3$ are each about 12 to 14 carbon atoms, n is about 15, and X is sodium.

The aqueous coating compositions of the present invention are characterized as having a VOC of less than about 3.5 pounds/gallon and more generally, a VOC of less than about 3.4 pounds/gallon. The compositions may comprise from about 20% to about 60% by weight of water. High-solids aqueous compositions also are contemplated as being within the present invention, and aqueous compositions of the present invention can be prepared containing up to about 50% by weight of solids. Generally, however, the solids content will be in the 20–35% by weight range.

The electroconductive coating compositions of the present invention also may contain supplemental electrically conductive materials, and in particular, one or more electrically conductive pigments (G). Although the conductive pigment may be organic or inorganic, the inorganic electroconductive pigments are preferred. Conductive carbon blacks also may be utilized as the conductive pigment although carbon black is generally avoided when it is desired to have a primer coating which is light in color. The specific conductive inorganic pigments utilized is not critical to the present invention provided that the pigments do not detract from any of the other desirable properties of the coating compositions. One commercially available conductive pigment found to be useful in the compositions of the present invention is a tin compound available as CP40W from Magnesium Elekton Co. Other examples of conductive pigments which can be utilized in the compositions of the present invention include carbon, antimony and tin oxide mixtures, nickel flakes, steel flakes, bronze powder, aluminum powder, etc.

The amount of conductive pigment contained in the aqueous compositions of the present invention may be varied over a wide range depending upon the degree of conductivity desired in the coating deposited from the coating compositions of the present invention. Amounts of conductive pigment of from about 5% to about 30% by weight, based on the total weight of the coating composition, have been found to be useful. The use of greater or lesser amounts is possible in some applications where either greater or less conductivity is desired.

In addition to the conductive pigments, other pigments can be utilized to provide the coating composition with the desired color. A variety of pigments can be utilized in the compositions of the present invention. Inorganic pigments which are useful include metal powders such as aluminum or bronze, titanium dioxide, silica, iron oxide red, talc, mica, claY, zinc oxide, aluminum oxide, magnesium oxide, strontium chromate, zinc chromate, cadmium sulfide, carbon black, lead chromate, zinc chromate, molybdate orange, calcium carbonate and barium sulfate. Organic pigments also can be used and these include Para Red, Lithol Rubine, Halio Bordeaux, Thio Indigo, Thio Indigoid, Toluidine, Dioxazine, Red Lake C, Red Lake R, Anthraquinone, Xylidide, Phthalocyanine Blue, Phthalocyanine Green, Azo, etc.

EXAMPLE 1

A first aqueous mixture (grind paste) is prepared comprising 2.35 parts of dimethylethanolamine, 1.18 parts of lecithin (amphoteric surfactant), 23.52 parts of water, 5.88 parts of propylene glycol, 5.88 parts of butyl carbitol, 1.41 parts of defoamer (Patcote 577 from C. J. Patterson Company), 15.67 parts of conductive pigment (CP40W), and 10.99 parts of titanium dioxide. The mixture is then ground by one of several methods known in the art of paint manufacture until a Hegman grind of 7+ is achieved.

To the above-prepared grind paste, there is added a premixture comprising 14.14 parts of a methylated melamine-formaldehyde resin (CYMEL 373 Resin from American Cyanamid Company), 7.07 parts of 30% aliphatic urethane dispersion (Witcobond 240 from Witco Corporation), 2.36 parts of water and 3.20 parts of 28% aqueous ammonia. There is then added a mixture of 4.24 parts of a 50% aqueous solution of a copolymer of dimethyl diallyl ammonium chloride with a hydroxy alkyl acrylate (available from Reliance Universal Inc., Resins Operation, Louisville, Ky. under the code designation RL-3182-4), 0.52 part of 40% solution toluene sulfonic acid as catalyst, and 1.04 parts of a 1-hydroxyethyl2-alkyl imidazoline prepared from oleic acid and available from Mona Industries, Inc. under the designation "Monazoline-O". There is then added to the mixture, 0.47 part of dibutylphthalate and 0.09 part of low molecular weight silicone leveling agent (BYK306 from Byk-Chemie). After the mixture is completely blended, the mixture is filtered through a 25 micron filter. The filtrate is the desired electroconductive coating composition. This composition contains 70.79% volatiles by volume.

EXAMPLE 2

An aqueous mixture of 9.09 parts of water and 0.27 part of hectorite clay is prepared and mixed at high speed until smooth. There is then added 11.987 parts of water, 0.59 part of Triton CF-10, 0.15 part of defoamer (Patcoat 577) and 12.56 parts of titanium dioxide pigment. The mixture is then ground at high speed until a Hegman 7+ grind is achieved. To the ground mixture, there are added 0.920 parts of viscosity modifier (SCT-270), and the mixture is blended until smooth to yield the desired grind paste.

In a separate tank, the following are premixed: 0.53 part of castor oil, 0.72 part of Witconate P-1059, 0.30 part of Polytergent B-150 and 10.49 parts of a 50 % xylene solution of the chlorinated polyolefin CP-343-3 from Eastman Kodak. To the tank, there is then added a premix comprising 2.96 parts of xylene, 0.11 part of Tinuvin 1130 and 0.06 part of Tinuvin 292. To this blend there is then added under high speed and with agitation, the grind paste prepared above. Subsequently, there is added a premix of 10.23 parts of water and 0.30 part of Bentone EW. Another premix containing 0.03 part of triethylamine, 2.71 parts of a methylated melamine-formaldehyde resin (CYMEL 373 resin from American Cyanamid Company) and 8.71 parts of water is added to the mixture in the tank with mixing. After standing overnight, 8.72 parts of water are added to adjust the viscosity, and 0.16 part of 28% aqueous ammonia is added to raise the pH to 7.8. A premix of 0.24 part of 28% aqueous ammonia, 1.87 parts of the DMDAAC copolymer RL-3182-4, and 16.29 parts of water is prepared and added to the above composition with agitation. The composition is filtered through a 50-micron filter. The filtrate contains 85.6% volume of volatiles and is characterized by a VOC of 3.09 pounds/gallon.

The aqueous electroconductive compositions of the present invention are useful particularly as coating compositions for various substrates, especially non-porous substrates such as plastics and metal substrates. The aqueous compositions are useful particularly as primer coatings on such non-porous substrates and the coatings may be electroconductive or non-conductive. Examples of plastic substrates which can be coated with the compositions of the invention include polyolefins, polyesters (including fiber filled), polycarbonates, polyolefin-elastomer mixes, etc. The coating compositions of the present invention, when used as primer coatings, exhibit excellent electroconductivity and adhesion to non-porous substrates. The aqueous compositions can be applied to the substrates by techniques known to those in the art such as by spraying, brushing, dipping, etc.

Once applied, the coating can be dried by heating to an elevated temperature of about 80° F. to about 400° F. The dry film thickness of primer coatings deposited on substrates usually ranges from about 0.2 mil to about 1.5 mils although greater film thicknesses can be deposited but generally are unnecessary.

The present invention also relates to a method of providing a substrate with a multi-layer coating and to multi-layer coated substrates produced by the method. Multi-layer coatings are obtained by the process which comprises (A) applying a film of the electroconductive coating compositions described above (with or without the substituted imidazoline (C)) to a plastic substrate as a primer coating;

(B) applying a pigmented coating composition to the primer-coated substrate of step (A), said pigmented coating composition comprising at least one thermosetting resin; and (C) heating the coated substrate obtained in step (B) to a temperature sufficient to at least partially cure the coated substrate.

The application of the electroconductive primer coating has been described above, and once the primer coating composition has been applied to the substrate, a second pigmented coating composition is applied to the primercoated substrate which, for convenience, will be referred to herein either as a "top coat" when the second coating is the final coating, or as a "base coat" when a third coating composition (generally a clear coating composition is described hereinafter) is applied thereover. The pigmented coating composition can be applied over the primer coating wet-on-wet, that is, the primercoated substrate can be subsequently coated without first being dried. Alternatively, the primer can be partially cured by baking prior to the application of the pigmented base coat. In one embodiment, for example, the primer coated substrate is baked for a period of from about 20 seconds to about 180 seconds at a temperature of about 80° F. to about 400° F. or higher prior to application of the pigmented base coat composition.

The pigmented base coat composition which is applied over the primer composition comprises, as indicated above, at least one thermosetting resin, at least one pigment and at least one solvent. Preferably, the thermosetting resin is a cross-linkable thermosetting resin capable of forming chemical bonds with the thermoset resin contained in the primer coating. The interaction between the resin in the primer coating in the cross-linkable thermosetting resin in the base coat results in improved and significant adhesion between the base coat and the primer coat. Examples of cross-linkable resins which can be utilized in the base coat include amino resins, alkyd resins, urethane resins, acrylic resins, epoxy resins, acrylic resins, phenolic resins, saturated or unsaturated polyester resins, allyl resins and furan resins. The choice of cross-linkable thermosetting resin utilized in the base coat composition can be readily determined by one skilled in the art based upon the properties which are desired. For example, if a soft-flexible film is desired, the polyester resins can be utilized, and if a harder film is desired, amino resins, acrylic resins or epoxy resins may be selected.

Any of the amino resins, alkyl resins, urethane resins, acrylic resins, epoxy resins, phenolic resins described earlier as resins useful in the primer coating compositions can be utilized in the base coat composition.

The polyester resin which can be utilized in the base coat compositions may be either saturated or unsaturated polyester resins formed by condensing the polycarboxylic acid or anhydride (either saturated or unsaturated) with at least one polyhydric alcohol. Examples of saturated polyester resins include the products of the reaction of a saturated dicarboxylic acid or anhydride such as phthalic acid or anhydride, isophthalic acid, tetrahydrophthalic anhydride, hexahydrophthalic anhydride, succinic acid, glutaric acid, adipic acid, pimelic acid, suberic acid, azelaic acid and sebacic acid with a dihydric alcohol such as ethylene glycol, propylene glycol, butylene glycol, diethylene glycol, triethylene glycol, and neopentyl glycol. Small amounts of a polyhydric alcohol such as glycerol, pentaerythritol, trimethylolpropane or sorbitol may be used in combination with the glycol. The unsaturated polyester resins are characterized by the vinyl unsaturation and the polyester backbone. The unsaturated polyester resins are obtained by reaction of any of the above-described glycols and polyols with an unsaturated dicarboxylic acid or anhydride such as maleic anhydride, fumaric anhydride, chloromaleic acid, itaconic acid, citraconic acid and mesaconic acid.

The allyl resins are formed by the addition polymerization of compounds containing the allyl group ($CH_2=CHCH_2-$), such as esters of allyl alcohol and dibasic acids. Examples of allyl resins include diallylphthalate, diallylisophthalate, diallylmaleate and diallylchlorendate.

The furan resins which may be utilized in the basecoat compositions are obtained primarily by the condensation polymerization of furfuryl alcohol in the presence of strong acids, sometimes in combination with formaldehyde or furfuraldehyde. These furan resins also include resins made by condensing phenol with furfural alcohol or furfuryl, and furfuryl-ketone polymers.

As mentioned above, the cross-linking thermosetting resin is incorporated into the base coat compositions used in the present invention to improve the adhesion of the basecoat applied to the primer coating. The cross-linking resin forms bonds with any cross-linkable resins contained in the primer.

Pigments may be included in the base coat formulation and any of the pigments described above with respect to the primer coating can be used on the base coat. The choice of a particular pigment or pigments will be determined by one skilled in the art from a consideration of the characteristics and color desired for the base coat. The solvents may be aliphatic and/or aromatic solvents of the types normally used in paints. Also, as in the primer coating, conventional additives may be included in the base coat formulation such as surfactants, antioxidants, ultraviolet light absorbers, stabilizers, rheology control agents, coalescing agents, levelling agents, etc.

Since the primer coating deposited on the plastic is electroconductive, the subsequent base coat of paint can be applied by electrostatic spray application techniques which are well-known to those skilled in this art.

In another embodiment, a clear coating composition is applied to the substrate containing the primer coat or to the substrate which has been given a primer coating and a base coat. The clear coating composition can also be applied wet-on-wet over the primer or base-coat or, alternatively, the base coat composition can be partially cured by baking prior to the application of the clear coat. In one preferred embodiment, the base coat is baked for a period of about 20 seconds to about 180 seconds at a temperature of from 80° F. to about 400° F. or higher prior to application of the clear topcoat composition.

The clear coating composition comprises at least one solvent and at least one thermosetting resin, and the clear coating compositions can be formulated with the same types of solvents and additives as have been described above in connection with the primer coating composition. However, the clear compositions do not contain pigments. After the clear coating composition is applied to the substrate, the coated substrate is heated to a temperature sufficient to cure the coated substrate. Generally, temperatures of from about 80° F. to about 400° F. are sufficient to effect the cure. This final heating step removes the solvent present and causes the coating layers to fuse together in a bonding process. The coated substrates prepared in this manner and in accordance with the process and compositions of the present invention are characterized by superior adhesion of the coatings, abrasion resistance and resistance to weathering and industrial pollutants.

As with the primer coatings, the base coat and clear coat compositions can be applied to the substrate by techniques well known in the art. For example, the coating compositions can be applied by spraying, dipping, brushing, etc. The dry film thickness of the base coat may range from about 0.5 mil to about 2 mils, and the dry film thickness of the clear topcoat may range from about 0.2 mil to about 2 mils.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. An electrically conductive aqueous coating composition comprising effective amounts of:
   (A) at least one water-dispersible or emulsifiable film-forming resin;
   (B) at least one electrically conductive polymer of a quaternary ammonium compound containing at least one polymerizable unsaturated group;
   (C) at least one hydrocarbon-soluble substituted imidazoline of a fatty acid;
   (D) at least one volatile organic liquid; and
   (E) water.

2. The composition of claim 1 wherein the film-forming resin (A) is at least one thermosetting resin.

3. The composition of claim 1 wherein the film-forming resin (A) comprises a urethane resin, an amino resin, an acrylic resin, an alkyd resin, an epoxy resin, a phenolic resin, a cyclized olefin rubber, or mixtures thereof.

4. The composition of claim 1 wherein the film-forming resin (A) is a urethane resin.

5. The composition of claim 1 wherein the conductive polymer (B) is a copolymer of the quaternary ammonium compound, and at least one ethylenically unsaturated copolymerizable compound.

6. The composition of claim 5 wherein the ethylenically unsaturated copolymerizable compound is at least one acrylic acid, acrylamide, or acrylic ester compound.

7. The composition of claim 5 wherein the ethylenically unsaturated copolymerizable compound is a hydroxyalkyl ester of acrylic acid or of a substituted acrylic acid.

8. The composition of claim 1 wherein (C) is at least one hydrocarbon-soluble substituted imidazoline of an unsaturated fatty acid.

9. The composition of claim 9 wherein the unsaturated fatty acid is oleic acid.

10. The composition of claim 1 wherein the substituted imidazoline (C) is characterized by the formula

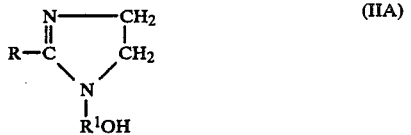

wherein
R is an aliphatic group containing about 7 to about 28 carbon atoms; and
$R^1$ is a lower alkylene group.

11. The composition of claim 1 also containing
(F) at least one surfactant.

12. The composition of claim 1 also containing at least one anionic or amphoteric surfactant and at least one nonionic surfactant.

13. The composition of claim 1 also containing
(G) at least one conductive pigment.

14. The composition of claim 13 wherein the conductive pigment is an inorganic pigment.

15. The aqueous coating composition of claim 1 characterized as having a VOC of less than about 3.5 pounds/gallon.

16. The composition of claim 1 containing at least about 15% by weight of non-volatile materials.

17. An aqueous coating composition having a VOC content of less than about 3.5 pounds/gallon comprising:
   (A) from about 10% to about 40% by weight of at least one water-dispersible or emulsifiable film-forming resin;
   (B) from about 2% to about 15% by weight of at least one electrically conducting polymer of a quaternary ammonium compound containing at least one polymerizable unsaturated group;
   (C) from about 0.25% to about 5% by weight of at least one hydrocarbon-soluble substituted imidazoline of a fatty acid;
   (D) from about 5% to about 20% by weight of at least one volatile organic solvent; and
   (E) from about 20% to about 60% by weight of water.

18. The composition of claim 17 which is an oil-in-water emulsion.

19. The composition of claim 17 wherein the resin (A) comprises a urethane resin, a melamine resin, an acrylic resin, an alkyd resin, a cyclized olefin rubber, or mixtures thereof.

20. The composition of claim 17 wherein the resin (A) comprises at least one melamine resin.

21. The composition of claim 17 wherein the resin (A) comprises a mixture of at least one melamine resin and at least one thermosetting resin capable of cross-linking with the melamine resin.

22. The composition of claim 17 wherein the polymer (B) comprises a copolymer of the quaternary ammonium compound containing at least one polymerizable unsaturated group, and at least one ethylenically unsaturated copolymerizable compound.

23. The composition of claim 22 wherein the copolymerizable compound is at least one acrylic acid, ester or amide.

24. The composition of claim 22 wherein the copolymerizable compound is at least one hydroxyalkyl ester of acrylic acid or of an alkyl-substituted acrylic acid.

25. The composition of claim 17 wherein the substituted imidazoline (C) is derived from an unsaturated fatty acid.

26. The composition of claim 17 wherein the substituted imidazoline is characterized by the formula

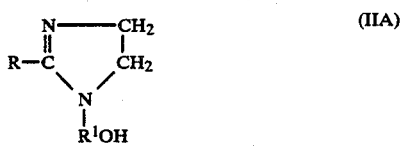

wherein
R is an aliphatic group containing about 7 to about 28 carbon atoms; and
$R^1$ is a lower alkylene group.

27. The composition of claim 26 wherein $R^1$ is an ethylene group.

28. The composition of claim 26 wherein R is an aliphatic group derived from oleic acid, stearic acid, tall oil acid or coconut oil.

29. The composition of claim 17 also containing
(F-1) at least one surfactant.

30. The composition of claim 17 also containing at least one nonionic surfactant and at least one amphoteric surfactant.

31. The composition of claim 17 also containing
(G) at least one electrically conductive pigment.

32. The composition of claim 31 wherein the electrically conductive pigment is an inorganic pigment.

33. The composition of claim 31 wherein the conductive pigment is present in an amount of from about 5% to about 30% by weight.

34. The composition of claim 17 wherein the quaternary ammonium compound containing at least one polymerizable unsaturated group of (B) is characterized by the formula

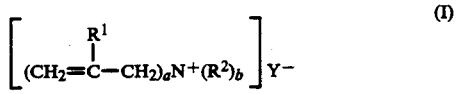

wherein each $R^1$ is independently hydrogen or a lower alkyl group, $R^2$ is independently an alkyl, hydroxyalkyl or alkoxyalkyl group containing from 1 to about 18 carbon atoms, a is an integer from 1 to 3, b is an integer from 1 to 3, the sum of $a+b=4$, and $Y^-$ is an anion.

35. The composition of claim 34 wherein each $R^1$ is hydrogen and each $R^2$ is a methyl or ethyl group.

36. A process for coating plastic substrates with an adherent electrically conductive primer coating which comprises the steps of:
(1) applying a film of an aqueous composition to the substrate, said composition being characterized by a VOC of less than about 3.5 pounds/gallon and comprising effective amounts of:
(A) at least one water-dispersible or emulsifiable film-forming resin;
(B) at least one electrically conductive polymer of a quaternary ammonium compound containing at least one polymerizable unsaturated group;
(D) at least one volatile organic solvent; and
(E) water; and
(2) heating the film to form the desired adherent coating on the plastic substrate.

37. The process of claim 36 wherein the plastic substrate is selected from the group consisting of polyolefins, polyesters, polycarbonates and polyolefin/elastomer mixtures.

38. The process of claim 36 wherein the filmforming resin of (A) comprises at least one thermosetting resin.

39. The process of claim 36 wherein the filmforming resin of (A) comprises at least one urethane resin, an acrylic resin, a melamine resin, an alkyd resin, a cyclized olefin rubber, or mixtures thereof.

40. The process of claim 36 wherein the polymer (B) is a copolymer of the quaternarY ammonium compound and at least one ethylenically unsaturated copolymerizable compound.

41. The process of claim 40 wherein the copolymerizable compound is at least one acrylic acid, acrylamide, acrylic ester, or mixtures thereof.

42. The process of claim 40 wherein the copolymerizable compound is at least one hydroxyalkyl ester of an acrylic acid.

43. The process of claim 41 wherein the aqueous composition applied in step (1) also contains
(C) at least one hydrocarbon-soluble substituted imidazoline of a fatty acid.

44. The process of claim 34 wherein the aqueous composition applied in step (1) also contains
(F) at least one electrically conductive pigment.

45. The process of claim 44 wherein the substituted imidazoline is characterized by the formula

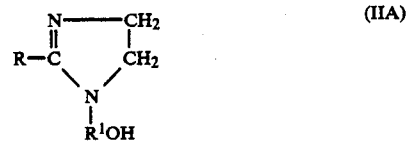

wherein
R is an aliphatic group containing about 7 to about 28 carbon atoms; and
$R^1$ is a lower alkylene group.

46. The process of claim 43 wherein the aqueous composition applied in step (1) also contains
(F) at least one electrically conductive pigment.

47. The process of claim 36 wherein the film is heated in step (2) to a temperature of from about 80° F. to about 400° F.

48. A plastic substrate coated in accordance with the process of claim 36.

49. A plastic substrate coated in accordance with the process of claim 43.

50. A plastic substrate coated in accordance with the process of claim 44.

51. A plastic substrate coated in accordance with the process of claim 46.

52. A process of providing a plastic substrate with an adherent multi-layer coating comprising the steps of:
(1) applying a pigmented coating composition to the coated plastic substrate of claim 48, said pigmented coating composition comprising at least one thermosetting resin; and
(2) heating the coated substrate obtained in step (1) to a temperature sufficient to at least partially cure the coated substrate.

53. A process of providing a non-porous plastic substrate with an adherent multi-layer coating comprising the steps of:
(1) applying a pigmented coating composition to the coated plastic substrate of claim 49, said pigmented coating composition comprising at least one thermosetting resin; and
(2) heating the coated substrate obtained in step (1) to a temperature sufficient to at least partially cure the coated substrate.

54. A process of providing a non-porous plastic substrate with an adherent multi-layer coating comprising the steps of:
(1) applying a pigmented coating composition to the coated plastic substrate of claim 50, said pigmented coating composition comprising at least one thermosetting resin; and
(2) heating the coated substrate obtained in step (1) to a temperature sufficient to at least partially cure the coated substrate.

55. A process of providing a non-porous plastic substrate with an adherent multi-layer coating comprising the steps of:
(1) applying a pigmented coating composition to the coated plastic substrate of claim 51, said pigmented coating composition comprising at least one thermosetting resin; and (2) heating the coated substrate obtained in step (1) to a temperature sufficient to at least partially cure the coated substrate.

56. The process of claim 52 wherein the coated substrate obtained in step (2) is coated with at least one coat of a clear, top-coating composition comprising a thermosetting polymer prior to heating step (2).

57. The process of claim 54 wherein the coated substrate obtained in step (2) is coated with at least one coat of a clear, top-coating composition comprising a thermosetting polymer prior to heating step (2).

58. A plastic substrate coated in accordance with the process of claim 52.

59. A plastic substrate coated in accordance with the process of claim 54.

60. A plastic substrate coated in accordance with the process of claim 56.

61. A plastic substrate coated in accordance with the process of claim 57.

* * * * *